Aug. 27, 1968 G. L. MISSIMER ET AL 3,398,893

DEVICE FOR DISPENSING SPRAY FROM A MOVING VEHICLE

Filed Jan. 24, 1966

INVENTORS.
GEORGE L. MISSIMER
IVAN RASOVICH

BY Edward A. Sokolski
ATTORNEY

3,398,893
DEVICE FOR DISPENSING SPRAY FROM A MOVING VEHICLE

George L. Missimer, Los Angeles, and Ivan Rasovich, La Crescenta, Calif., assignors to Missimers Incorporated, Glendale, Calif., a corporation of California
Filed Jan. 24, 1966, Ser. No. 522,583
10 Claims. (Cl. 239—77)

---

ABSTRACT OF THE DISCLOSURE

A spray dispenser having a sleeve bearing supporting rotating members including a propeller, a hollow chamber having a concave inner surface with radial orifices therethrough, and heat sink hub.

---

This invention relates to a device for dispensing spray from a moving vehicle and more particularly to such a device which is rotatably driven by an air stream which is useful in dispensing pesticide over relatively wide areas of terrain.

The spraying of wide areas of terrain with pesticide, as for example in spraying crops, forests or swamp areas, is generally accomplished by means of spray dispensers mounted on an aircraft which is flown over the area to be sprayed. Devices of the prior art for accomplishing this end result often utilize a propeller driven by the air stream which rotates a spray dispenser mechanism which in turn provides the dispensing action by virtue of the centrifugal thrust thus generated. Devices of this type of the prior art have several shortcomings. Firstly, many of these devices are overly complicated and expensive in their construction. In view of the high speed of rotation to which the spinning mechanism is subjected when moving even at moderate speeds, extremely rugged operation characteristics, especially in the rotation mechanisms, are necessary in devices of this type. Many of the devices of the prior art utilize rotation mechanisms that leave much to be desired along these lines. Easy replacement of components in the field is also highly desirable should a failure occur. Many of the devices of the prior art do not lend themselves to ready replacement of worn rotation members. Also, many of the spray devices of the prior art fail to provide an optimum dispersion of the spray, both as to particle size and swath distribution.

The device of this invention overcomes the shortcomings of prior art devices in providing a simple, highly reliable spray dispenser of relatively economical construction. The device of this invention utilizes a rotation mechanism of highly rugged construction which is capable of long hours of reliable use. By the same token, construction is such that the device can readily be disassembled and reassembled in the field to replace any of the components should the need arise. The device of the invention further utilizes a unique mechanism for dispersing the liquid which makes for a spray having optimum particle size which is dispensed in a superior wide swath dispersion pattern. While the device of the invention is relatively easily disassembled and reassembled, in their assembled configuration the components are coupled together so that there is little likelihood of any of such components being thrown off during operation and thus causing a hazard.

The device of the invention achieves the aforementioned improvements by utilizing an elongated sleeve bearing mount for supporting the rotating members. Cooling is provided for this bearing to minimize the wear thereof by means of a heat sink provided in the form of an aerodynamically shaped hub member which is efficiently cooled by the air stream. This is particularly important when the device rotates without liquid flow through it, such as when in transit without application of liquid spray, as under such conditions the device does not have the benefit of liquid cooling. The hub member is fixedly attached to a spray distributor member which rotates therewith. The spray distributor member has a chamber formed therein having a concave surface against which the spray liquid is impelled. Arranged around the circumference of the distributor member are a plurality of spray orifices which extend from the distributor chamber to the outside of the distributor and are each canted with respect to an associated distributor radius in a direction opposite to the direction of distributor rotation. The liquid is thus dispersed by the concave distributor chamber surface and thrust outwardly against the spray orifice walls and through the spray orifices by the centrifugal force generated with the rotation of the distributor member. Ideal dispersion of the fluid is achieved by virtue of the dispersion surface in the distributor chamber acting in conjunction with the spray orifices and a mesh screen which surrounds such orifices.

It is therefore an object of this invention to provide an improved spray dispenser for dispensing spray from a moving vehicle.

It is a further object of this invention to provide a wind driven spray dispenser having greater reliability than prior art devices.

It is still another object of this invention to provide a wind driven spray dispenser which can readily be assembled and disassembled for replacement of parts in the field.

It is still another object of this invention to provide a wind driven spray dispenser having a rotation mechanism of improved reliability.

It is still a further object of this invention to provide a wind driven spray dispenser having improved means incorporated therein for efficiently removing heat from the rotation bearing thereof.

It is still a further object of this invention to provide a spray dispenser of relatively economical construction which has superior spray dispersion characteristics.

Other objects of this invention will become apparent from the following description taken in connection with the accompanying drawings, of which FIG. 1 is a perspective view of a preferred embodiment of the device of the invention, FIG. 2 is an exploded view of the preferred embodiment of the device of the invention, FIG. 3 is a cross sectional view of the preferred embodiment of the device of the invention as taken along the plane indicated by 3—3 in FIG. 1, and FIG. 4 is a cross sectional view of the preferred embodiment of the deivce of the invention as taken along the plane indicated by 4—4 in FIG. 2.

Referring now to the figures, a preferred embodiment of the device of the invention is illustrated. Propeller 11, hub member 12 and bearing sleeve 13 are joined together in a press tight fit. Hub member 12 is attached to distributor member 17 by means of screws 18. Propeller 11, hub member 12, bearing sleeve 13 and distributor member 7 are thus joined together to form a unitary assembly. This assembly is rotatably supported on shaft member 15, this shaft member being retained within bearing sleeve 13 with its threaded end portion 15a threadably engaging input coupler 21 and with its flanged portion 15b riding against wear resistant washer 19, which in turn abuts against flanged portion 13a of bearing sleeve 13. Propeller 11, thrust washer member 19 and distributor member 17 are preferably fabricated of wear resistant synthetic plastics such as Teflon or nylon, while the remaining members are preferably fabricated of metal. Fitted over distributor member 17 is cylindrical wire mesh screen 20.

Distributor member 17 has a chamber 17a formed therein, the rear walls 17b of such chamber being concave in configuration in the general form of a cone. Circumferentially surrounding chamber 17a are a plurality of orifices 17c which interconnect the chamber with a recessed portion of the outside wall of the distributor. Orifices 17c are canted with respect to the circumference of the distributor member, such angle of cant preferably being about 15 degrees. The angle of cant runs opposite to the direction of rotation of the distributor, which is indicated by arrow 22 in FIG. 4 and arrows 32 in FIG. 1.

Hub member 12 effectively acts as a heat sink to aid in the cooling of the bearing surfaces between sleeve 13 and shaft 15. The sleeve bearing thus formed, although it has a fairly large surface area, can generate fairly high amounts of heat at the high rotation speeds involved in airborne operations (2000–5000 r.p.m.). Hub member 12, which is preferably fabricated of a metal such as aluminum having high heat conductivity, has a generally conical shape conducive to good aerodynamic flow along its surfaces so that the air stream provides efficient convective cooling thereof which enables effective cooling of the bearing surfaces.

The device operates as follows: The device is mounted on a vehicle, in the case of an aircraft preferably under the wings. With motion of the vehicle in the direction indicated by arrow 30 (FIG. 1), propeller 11 is rotated by the air stream in the direction indicated by arrows 32. Propeller 11 rotatably drives the unitary assembly, including hub member 12, distributor member 17 and bearing sleeve 13, on shaft 15.

Spray fluid is forced under pressure by means of a pump (not shown) into chamber 17a from input line 23 through check valve 24, input coupler 21 and orifice 15d formed in shaft 15. The fluid is impelled against the concave wall portion 17b of the chamber, and dispersed outwardly through orifices 17c by virtue of the pumping action produced by the centrifugal force generated with the rotation of distributor member 17. Dispersion of the liquid into a uniform spray is effectively achieved by the combined dispersion action of concave surfaces 17b, the walls of canted orifices 17c and wire mesh screen 20. It has been found that improved spray dispersion is achieved by virtue of the canted relationship of orifices 17c, opposite to the direction of rotation of the distributor member. The liquid is thereby impelled against the orifice walls to improve the dispersion of the spray. Finally wire mesh screen 20 provides a still further dispersion of the spray as it leaves the distributor.

The device of the invention thus provides a simple and highly reliable spray dispenser which is capable of superior spray dispersion. The device of the invention has been found to be particularly effective in wide swath aerial spraying of low volume spray concentrate.

While the device of the invention has been described and illustrated in detail, it is to be clearly understood that this is intended by way of illustration and example only and is not to be taken by way of limitation, the spirit and scope of this invention being limited only by the terms of the following claims.

We claim:
1. In a device for dispensing spray,
   a cylindrical shaft member, said shaft member having a channel formed therein running along the longitudinal axis thereof,
   a bearing sleeve,
   a hub member attached to said bearing sleeve for providing a heat sink therefor,
   an input coupler connected to one end of said shaft member,
   a distributor member attached to said hub member,
   said distributor member, said bearing sleeve and said hub member being joined together in fixed relationship to each other,
   said bearing sleeve being rotatably supported on said shaft member,
   said distributor member having a chamber formed therein, said chamber having a concave surface, said distributor member further having a plurality of spray orifices formed therein and running around the circumference thereof, said orifices extending from said chamber to the outside of said distributor member,
   means for impelling liquid through said shaft member channel against the concave surface of said distributor member thereby causing the liquid to be dispersed by said surface, and
   means for rotatably driving said distributor member to generate centrifugal force to thrust the liquid outwardly through said spray orifices,
   whereby the liquid is dispersed through said spray orifices in a uniform spray.

2. The device as recited in claim 1 wherein said means for rotatably driving said distributor member includes a propeller fixedly attached to said bearing sleeve.

3. The device as recited in claim 1 wherein said hub member has the general shape of a truncated cone and is fabricated of a material having good heat conductivity so as to form a heat sink for said bearing sleeve.

4. The device as recited in claim 1 wherein each spray orifice is canted with respect to an associated radius of the distributor member.

5. The device as recited in claim 4 wherein the angle of cant is opposite to the direction of rotation of said distributor member.

6. The device as recited in claim 5 wherein the angle of cant is about 15 degrees.

7. The device as recited in claim 1 and further including a wire mesh screen mounted on said distributor member and surrounding said spray orifices.

8. In a device for dispensing liquid spray,
   a cylindrical shaft member, said shaft member having a channel formed therein running along the longitudinal axis thereof,
   a cylindrical bearing sleeve,
   a hub member directly attached to said bearing sleeve, said hub member having a substantially conical shape,
   a cylindrical distributor member attached to said hub member,
   means for joining said distributor member, said bearing sleeve and said hub member together in fixed relationship to each other,
   said bearing sleeve being rotatably supported on said shaft member,
   said distributor member having a chamber formed therein, said distributor member further having a plurality of spray orifices formed therein and running around the circumference thereof, said orifices extending from said chamber to the outside of said distributor member,
   means for impelling liquid through said shaft member channel against a solid wall of said distributor member chamber to cause dispersion thereof, and means for rotatably driving said distributor member thereby generating centrifugal force to thrust the liquid outwardly through the spray orifices, whereby the liquid is dispersed through said spray orifices in a uniform spray.

9. The device as recited in claim 8 wherein the wall of the distributor member chamber against which said liquid is impelled has a substantially concave conical shape.

10. The device as recited in claim 9 wherein said distributor member has a recessed portion extending circumferentially around the outside wall thereof, said spray orifices being located in said recessed portion.

References Cited

UNITED STATES PATENTS

| | | | |
|---|---|---|---|
| 2,512,782 | 6/1950 | Strickland | 239—77 |
| 2,721,102 | 10/1955 | Nissen | 239—171 |
| 2,979,269 | 4/1961 | Bals | 239—77 |
| 3,279,427 | 10/1966 | Clancy | 239—222 |

M. HENSON WOOD, Jr., *Primary Examiner.*

H. NATTER, *Assistant Examiner.*